April 21, 1959 R. McCOWAN UNGER ET AL 2,882,587
BRAZING METHODS
Filed Dec. 10, 1956
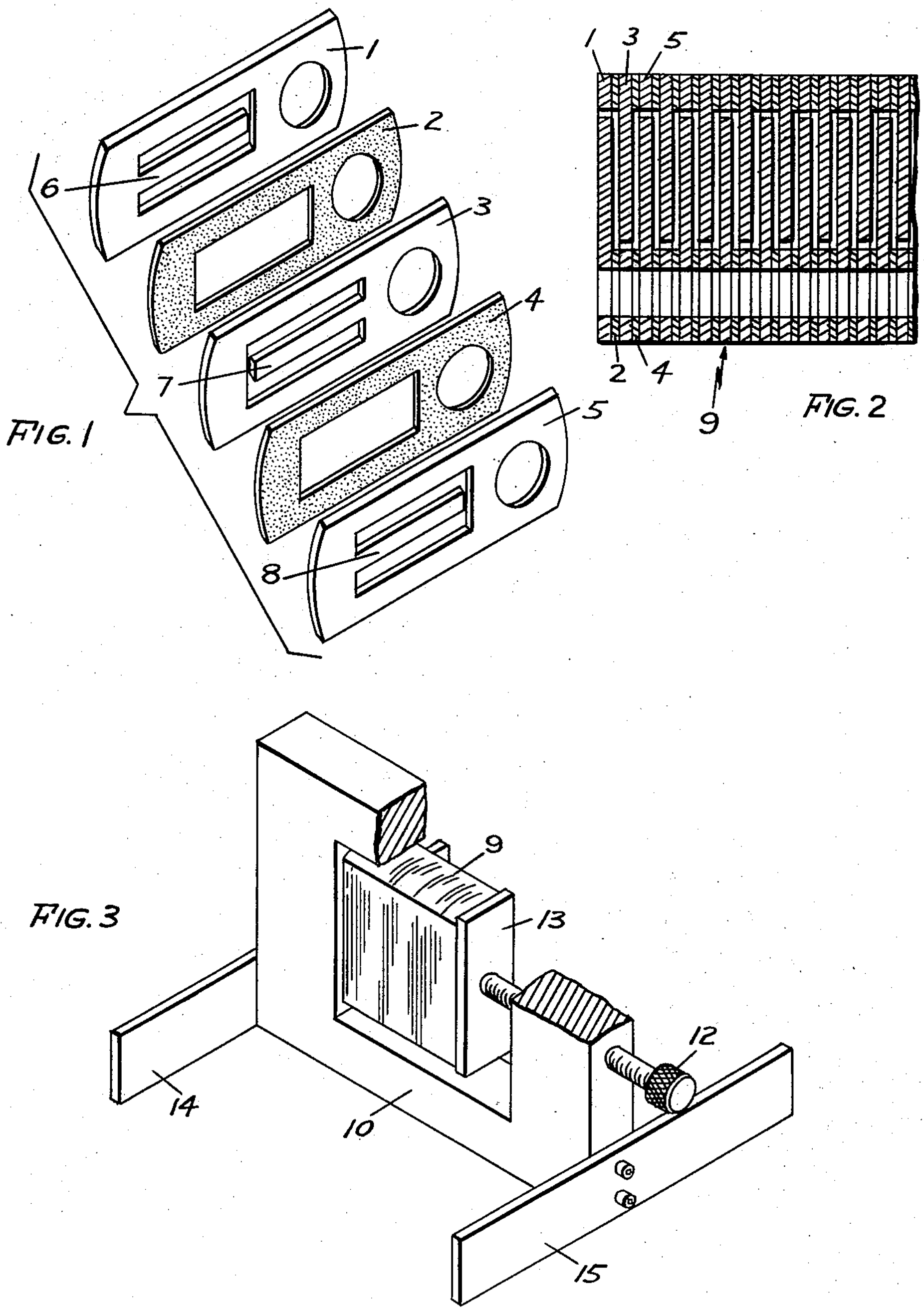
INVENTORS
ROBERT McCOWAN UNGER
ROBERT HARPER
BY Elmer J. Gorn
ATTORNEY 2,882,587

BRAZING METHODS

Robert McCowan Unger, Wayland, and Robert Harper, Waltham, Mass., assignors to Raytheon Manufacturing Company, Waltham, Mass., a corporation of Delaware Application December 10, 1956, Serial No. 627,453

2 Claims. (Cl. 29—155.5)

This invention relates generally to a brazing method for producing a unified laminar copper structure, and more particularly to the utilization of that brazing method in the manufacture of electron tubes of the traveling wave type.

Certain traveling wave tubes employ an internal structure known as an interdigital delay line, which consists of closely-spaced, elongate, electrically conductive, metallic bars aligned in a row. Interdigital lines were formerly manufactured by gang milling from copper blanks, two similar structures having aligned dependent teeth, each of the structures being similar in appearance to a comb. The combs were secured in a casing and arranged so that the teeth of one comb were coplanar with and positioned between the teeth of the other comb. In traveling wave tubes of the interdigital delay line type, the teeth are necessarily thin, and the distance between adjacent teeth of the interdigital line is critical. This prior method of manufacture is not suited to the rapid production of traveling wave tubes of the interdigital delay line type.

A different method of constructing a traveling wave tube having an interdigital delay line has been devised and is more fully set forth in patent application Serial No. 579,972, filed April 23, 1956, by Rudolph C. Hergenrother. In accordance with the disclosure of the aforementioned application, the traveling wave tube is constructed from a number of thin copper stampings or laminae brazed to form an integral laminar metallic structure. In attempting to form a satisfactory vacuum-tight joint between adjacent stampings, it was found that molten solder was drawn by capillary action between the closely-spaced inwardly-projecting fingers which formed the interdigital line. This is not surprising when one realizes that solder in a molten state acts like any liquid, and because copper, which is customarily brazed in a hydrogen or reducing atmosphere, presents a wettable surface, the molten solder tends to be drawn into small cracks and gaps and even upwardly along exposed surfaces. The usual and well-known brazing techniques were found to be unsatisfactory because an excess of solder was almost always present and formed fillets between the closely-spaced fingers. In an attempt to eliminate an excess of solder, the amount of solder used for brazing together the laminae or stampings was radically reduced, with the result that a vacuum-tight joint could not be obtained. Further experimentation proved that a satisfactory brazed joint could not be obtained consistently merely by controlling the amount of solder. Conditions other than chemical affinity are involved in the satisfactory bonding of metals. Minute differences in the physical characteristics among laminae may, with an identical amount of solder, in one instance promote good bonding, and in another militate against an effective bond. The present invention is based upon the realization that not only must the amount of solder be controlled, but also that high-intensity pressure must be applied in a direction to compress the braze joint during the heating cycle. In order to gradually induce the high-intensity pressure required, this invention contemplates utilizing a difference in thermal expansion coefficients between metals. The stampings which are made of copper are aligned on an arbor, forming a laminated stack, and the stack is placed in a rigid metallic frame. As the unit is heated to brazing temperature in a furnace, the copper stack, which has a higher coefficient of thermal expansion than the frame, tends to expand more than the frame, so that a high-intensity pressure is exerted throughout the copper stack by the restraint imposed by the frame. It has been found that by careful control of the quantity of solder and the employment of high-intensity pressures during heating, a satisfactory vacuum-tight joint can be uniformly obtained without having any excess of solder. Because the copper stampings are thin and are usually less than $\frac{1}{16}$" thick, high compressive forces can be exerted on the stampings while the laminae are heated to brazing temperature without causing a discernible plastic flow of the copper. Under the same conditions, a thick copper stamping would be deformed so that it would be materially reduced in thickness, and peripheral bulges would result because of the flow of material toward regions of lower pressure. In practicing this invention, the intensity of the induced pressure is adjusted so that no bulging or peripheral beading effect can be discerned in the thin copper stampings, or, as an alternative, where reduction in intensity of pressure is indicated by peripheral bulging of the stampings, the stampings may be made of thinner stock and more of the stampings employed.

In the drawings accompanying and forming a part hereof:

Fig. 1 is a perspective view of stampings which form the laminated casing of a traveling wave tube;

Fig. 2 is a cross-sectional view of a brazed unified casing, and illustrates the arrangement of the dependent fingers which form the interdigital line; and Fig. 3 depicts a frame for inducing high-intensity pressure in the laminated stack during the brazing operation.

While the description of the invention will be confined to a method for constructing a laminar copper casing of a traveling wave tube having an interdigital line, it should be understood that the method of brazing disclosed herein can be applied to the construction of other laminar metallic devices having closely-spaced parts from which brazing material must be excluded. It will be noted in Fig. 1 of the drawings that the stampings 1, 3 and 5 have inwardly-projecting fingers 6, 7 and 8, whereas the stampings 2 and 4 do not include such fingers. The stampings 2 and 4 function as spacers in the integrated structure and provide precise separation between the fingers 6, 7 and 8. The unitary casing shown in Fig. 2 is made of a large number of thin stampings brazed together to form an integrated laminar structure. The thickness of each of the stampings 1, 3 and 5 is approximately .040", and the spacers 2 and 4 are also approximately $\frac{1}{32}$" thick. The dies for making the stampings are very accurately constructed and are hardened so that large numbers of stampings may be struck from thin sheets of copper while maintaining high dimensional precision. In the traveling wave tube, the dimensions of the fingers of the interdigital line are critical. It has been found in practice that these critical dimensions are readily maintained by the employment of such accurate dies. The copper employed in the stampings should be ductile, free of oxygen, and have high electrical conductivity. A variety of copper known as OFHC copper has been employed with satisfactory results. The stampings, after being formed by the dies, are cleaned, for example by anodic pickling, to render their surfaces free from grease and other contaminants. As a precaution, the stampings should not be handled with bare hands until after firing in the brazing furnace because the skin secretes oils and inorganic salts which interfere with the formation of a good band. The stresses set up in the copper stampings by the die-stamping operation are relieved by annealing the copper while concurrently applying a uniform pressure to prevent curling or bending of the stamping. The annealing operation is preferably carried on in a reducing atmosphere to remove any oxides which may have formed on the stampings. Those stampings which do not have a dependent finger, i.e. stampings 2 and 4 of Fig. 1, are then plated with silver so that a coat is formed having a thickness of the order of .0002". These stampings are preferably electroplated because of the ease with which the thickness of the coat may be controlled and because a pure silver uniform covering is obtained. To avoid thin tarnish films on the silver-plated surfaces, immediately after plating the work the stampings are rinsed in hot water, dipped into clean alcohol and dried in hot air. The stampings are assembled on a fixture having a means for precisely aligning the fingers which comprise the interdigital line. In the process of assembly, an uncoated stamping is alternated with a coated stamping, so that the laminated stack consists of stampings such as 1, 3 and 5 and interleaved silver-plated spacers such as 2 and 4. The assembled stack 9 is placed in a rigid frame 10 as indicated in Fig. 3, and the knurled screw 12 is tightened to clamp the stack within the rectangular opening of the frame. Frame 10 is fabricated of a high-strength material, preferably steel, having an appreciably lower coefficient of thermal expansion than the copper from which the stampings are made. A frame fabricated of a steel having ⅗ the expansion of copper has, in practice, rendered creditable service. The dimensions of the frame 10 will necessarily be governed by the length of the stack 9, the types of materials employed, the cross-sectional area of the stack and the intensity of the pressure which it is desired to induce in the copper by the differential expansion of the two metals. In order to secure uniformly-distributed pressure throughout the cross-sectional area of the stack, a screw 12 is threaded through one leg of the frame 10, and a bearing plate 13 is inserted between one end of the stack 9 and the inner end of the screw 12. The entire assembly (the frame and the stack) is placed in a furnace having a neutral or reducing atmosphere and gradually heated to about 800° C. and maintained at this temperature for twenty to thirty minutes. As the temperature is gradually increased, the laminated stack, because of its higher thermal coefficient, tends to expand at a faster rate than the frame, so that a compressive force is induced in the copper stack which increases with the rising temperature. As a result of the differential expansion, the silver while in the solid state is caused to diffuse into the copper and form a silver-copper alloy. It is thought that by the time the temperature has risen to 779° C., the temperature at which the silver-copper eutectic melts, enough of the silver has previously diffused into the copper so that the remaining unalloyed silver rapidly diffuses into the copper, thus leaving no excess solder exudate. Whether or not the foregoing theory as to what occurs during the heating period is valid, actual experience proves that the application of high-intensity pressure accomplishes the formation of a vacuum-tight bond without an accompanying excess of solder. The laminated stack is subsequently slowly cooled so that the copper is again annealed. Upon attaining normal temperature, the unified stack has a length equal to the sum of the initial thicknesses of the bare copper stampings; that is, the silver plate seemingly does not contribute to the final length of the integrated laminar structure. This decrease in the volume of the stack indicates that the silver plate entirely diffuses into the copper.

Those familiar with the behavior of metals under diverse pressure and temperature conditions will apprehend that the decrease in volume is significant for another reason. It is well known that the rate of solid-state diffusion of one metal into another is related to conditions of temperature and pressure, and that higher temperatures and pressures increase the rate of diffusion; hence, as the stack of laminates is gradually heated in the brazing furnace, the pressure induced by the differential expansion initially is small, and consequently the silver diffuses into the copper at a very low rate. As the temperature increases, the differentially-induced pressure also increases, thereby increasing the rate of solid-state diffusion which, in turn, results in reduced volume and a consequent reduction of the induced pressure. It is surmised that, some time before brazing temperature (above 779° C.) is reached, the induced pressure has passed a maximum value and is considerably reduced at the brazing temperature. This action is beneficial, since copper becomes somewhat "soft" at elevated (brazing) temperatures and readily flows under large applied pressures.

While the invention has been described with reference to copper laminates, the brazing method here disclosed is applicable to the bonding of many copper alloys, and the term "copper" as used herein is intended to include those suitable alloys of which copper is the principal constituent. In addition to copper, nickel and related alloys such as Monel can be bonded by this brazing method using silver to produce an effective union. In lieu of silver, pure gold may also be used in this diffusion method of bonding metallic laminates. When gold is employed, the brazing temperature and length of heating cycle will be somewhat different; however, it is not difficult to establish the proper conditions by empirical methods.

An incidental but valuable consequence of the brazing method detailed herein is the formation of a solder having a higher melting point than the silver-copper eutectic. This permits a plurality of previously-brazed stacks to be later joined together by a eutectic braze without danger of remelting the initial assembly; that is, the subsequently brazing operation is performed at a temperature between 779° C. and 800° C. The high-intensity pressure method of brazing disclosed herein assures intimate contact of the metals, reduces the quantity of silver normally required, completely eliminates solder exudates, and results in satisfactory, vacuum-tight, mechanically strong unions.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In the manufacture of an interdigital delay line having aligned precisely-spaced digits, the method which comprises striking from sheet copper a first set of stampings, each of said stampings having an appendant digit, striking from sheet copper a second set of stampings, coating each stamping of said second set with a silver plate of the order of .0002" thick, stacking said stampings so that the appendant digits are aligned and adjacent digits are maintained in a spaced relation by the interposition of stampings of said second set, placing the stack in a rigid frame constructed from material having an appreciably lower coefficient of expansion than the copper stampings, and heating the assemblage above the melting point of the silver-copper eutectic whereby the inhibited thermal expansion of the stack causes the induction therein of pressures of an intensity not exceeding those which would initiate plastic flow in the copper laminae.

2. In the manufacture of an interdigital delay line, the method which comprises the steps of forming a plurality of flat copper stampings, each of said stampings having an aperture in which an appendant digit is situated, forming a plurality of flat copper spacers, each of said spacers having an aperture therein, coating each spacer with a silver plate of the order of .0002" thick, stacking said stampings so that the appendant digits are aligned and adjacent digits are maintained in a spaced relation by the interposition of spacers, placing the stack in a rigid frame constructed from material having a lower coefficient of expansion than the copper stampings, and heating the assemblage above the melting point of the silver-copper eutectic whereby the inhibited thermal expansion of said stack causes the production of pressures of a maximum intensity slightly below that which would initiate plastic flow in the copper members.

References Cited in the file of this patent

UNITED STATES PATENTS

| | | |
|---|---|---|
| 385,783 | Whiting | July 10, 1888 |
| 1,840,724 | Koehring | Jan. 12, 1932 |
| 2,398,449 | Ronci | Apr. 16, 1946 |
| 2,473,712 | Kinney | June 21, 1949 |
| 2,641,731 | Lines | June 9, 1953 |
| 2,698,913 | Espersen | Jan. 4, 1955 |
| 2,708,249 | Pryslak | May 10, 1955 |
| 2,761,197 | Harbaugh | Sept. 4, 1956 |